United States Patent
Roszko et al.

(10) Patent No.: US 10,590,793 B1
(45) Date of Patent: Mar. 17, 2020

(54) DIFFUSER FOR DIFFUSING THE FLOW OF EXHAUST GAS AND A SYSTEM INCLUDING THE SAME

(71) Applicant: BorgWarner Inc., Auburn Hills, MI (US)

(72) Inventors: Jeremy Richard Owen Roszko, Hendersonville, NC (US); Michael Eugene Harris, Fairview, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/173,388

(22) Filed: Oct. 29, 2018

(51) Int. Cl.
| | | |
|---|---|---|
| *F01D 17/14* | (2006.01) | |
| *F02B 37/18* | (2006.01) | |
| *F02C 6/12* | (2006.01) | |
| *F02B 37/24* | (2006.01) | |

(52) U.S. Cl.
CPC .......... *F01D 17/143* (2013.01); *F02B 37/186* (2013.01); *F02B 37/24* (2013.01); *F02C 6/12* (2013.01); *F05D 2220/40* (2013.01)

(58) Field of Classification Search
CPC ...... F01D 17/143; F02B 37/24; F02B 37/186; F02C 6/12; F05D 2220/40
USPC ........................................ 60/602, 605.1–611
See application file for complete search history.

(56) References Cited

U.S. PATENT DOCUMENTS

| | | | |
|---|---|---|---|
| 4,655,043 A * | 4/1987 | McInerney | F01D 17/08 60/602 |
| 8,984,880 B2 | 3/2015 | Marques et al. | |
| 9,739,282 B2 | 8/2017 | Lombard et al. | |
| 2011/0083935 A1 | 4/2011 | Katano et al. | |
| 2013/0219884 A1* | 8/2013 | Williams | F01D 25/16 60/605.1 |
| 2014/0366531 A1* | 12/2014 | Segawa | F02B 37/186 60/602 |
| 2015/0014116 A1 | 1/2015 | Kimes et al. | |
| 2015/0037141 A1* | 2/2015 | Gerard | F04D 1/00 415/119 |
| 2015/0361985 A1 | 12/2015 | Edwards et al. | |
| 2016/0036311 A1 | 2/2016 | Lee | |
| 2016/0245119 A1 | 8/2016 | Wilkins et al. | |
| 2017/0152793 A1 | 6/2017 | Albrecht et al. | |
| 2018/0223725 A1* | 8/2018 | McHenry | F01D 17/105 |

* cited by examiner

*Primary Examiner* — Hoang M Nguyen
(74) *Attorney, Agent, or Firm* — Howard & Howard Attorneys PLLC (57) ABSTRACT

A turbocharger includes a turbine housing. The turbine housing includes an interior surface defining a turbine housing interior. The interior surface extends between a turbine housing inlet and a turbine housing outlet. The turbine housing also includes a wastegate duct disposed between the turbine housing inlet and the turbine housing outlet and defining a wastegate channel in fluid communication with the turbine housing inlet and the turbine housing outlet. The turbocharger also includes a valve seat and wastegate assembly including a valve movable between a first position and a second position. The turbocharger further includes a diffuser at least partially surrounding the valve seat for uniformly diffusing the flow of exhaust gas into the turbine housing outlet.

20 Claims, 7 Drawing Sheets

DIFFUSER FOR DIFFUSING THE FLOW OF EXHAUST GAS AND A SYSTEM INCLUDING THE SAME

BACKGROUND OF THE INVENTION

1. Field of the Invention

The subject invention generally relates to a diffuser for a turbine housing of a turbocharger for a system which also includes an internal combustion engine, and a catalytic converter.

2. Description of the Related Art

Conventional vehicles include an internal combustion engine which produces exhaust gas. Some conventional vehicles also include a turbocharger which receives exhaust gas from the internal combustion engine and directs the exhaust gas to an exhaust system. During the movement of exhaust gas to the exhaust system, it is required by federal law for the exhaust gas to flow to a catalytic converter prior to entering the exhaust system in order to meet current emissions standards.

Conventional vehicles which include the turbocharger may include one or more components disposed about a turbine wheel of the turbocharger in order to diffuse exhaust gas from the turbine wheel to a turbine outlet. However, these conventional vehicles exhibit non-optimal characteristics, including exhaust gas bypassing the turbine wheel through a wastegate or bypass channel being moved directly to the catalytic converter which can cause premature failure of the catalytic converter due to high velocity of the flow of exhaust gas. Direct flow of exhaust gas to the catalytic converter can also cause slow warmup of the catalytic converter during a cold start of the internal combustion engine, leading to undesirable emissions from the exhaust system during warmup. As such, there remains a need for improved flow of exhaust gas to the catalytic converter to prevent premature failure and improve operation of the catalytic converter.

SUMMARY OF THE INVENTION AND ADVANTAGES

A turbocharger for receiving exhaust gas from an internal combustion engine and for delivering exhaust gas to an exhaust system is disclosed herein. The turbocharger includes a turbine housing. The turbine housing includes an interior surface defining a turbine housing interior. The interior surface extends between a turbine housing inlet and a turbine housing outlet. The turbine housing inlet is defined at one end of the interior surface and is in fluid communication with the internal combustion engine and the turbine housing interior for delivering exhaust gas from the internal combustion engine to the turbine housing interior. The turbine housing outlet is defined at an opposite end of the interior surface and is in fluid communication with the turbine housing interior for discharging exhaust gas from the turbine housing interior. The turbine housing also includes a wastegate duct disposed between the turbine housing inlet and the turbine housing outlet and defining a wastegate channel in fluid communication with the turbine housing inlet and the turbine housing outlet. The wastegate channel for discharging exhaust gas to the turbine housing outlet from the turbine housing inlet by bypassing the turbine housing interior. The turbocharger further includes a wastegate assembly disposed within the turbine housing for controlling flow of exhaust gas through the wastegate channel. The wastegate assembly includes a valve seat disposed within the wastegate channel and a valve engageable with the valve seat. The valve is movable between a first position where the valve is engaged with the valve seat for preventing flow of exhaust gas through the wastegate channel, and a second position where the valve is disengaged with the valve seat for allowing flow of exhaust gas through the wastegate channel. Additionally, the turbocharger includes a diffuser at least partially surrounding the valve seat for uniformly diffusing the flow of exhaust gas into the turbine housing outlet.

Additionally, a system including the turbocharger is disclosed herein. The vehicle also includes an internal combustion engine configured to produce exhaust gas, an exhaust system configured to deliver exhaust gas out of the vehicle, and a catalytic converter disposed between the internal combustion engine and the exhaust system.

Finally, a method of operating the system is disclosed herein. The method includes activating the internal combustion engine causing exhaust gas to flow from the internal combustion engine to the inlet of the turbocharger, moving the wastegate valve from the first position where the valve is engaged with the valve seat for preventing flow of exhaust gas through the wastegate channel to the second position where the valve is disengaged with the valve seat for allowing flow of exhaust gas through the wastegate channel, and uniformly diffusing the exhaust gas exiting the wastegate channel to the catalytic converter with the diffuser.

Having the diffuser at least partially surrounding the valve seat allows the exhaust gas exiting the wastegate duct to be uniformly diffused into the turbine housing outlet and to the catalytic converter. Having a uniform flow of exhaust gas to the catalytic converter improves heating of the catalytic converter during a cold start of the internal combustion engine by uniformly directing the flow to the catalytic converter and thereby preventing overheating of the catalytic converter. Moreover, uniformly diffusing the exhaust gas to the catalytic converter spreads the stream of exhaust gas out and prevents premature failure of the catalytic converter due to direct high velocity of the flow of the exhaust gas.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
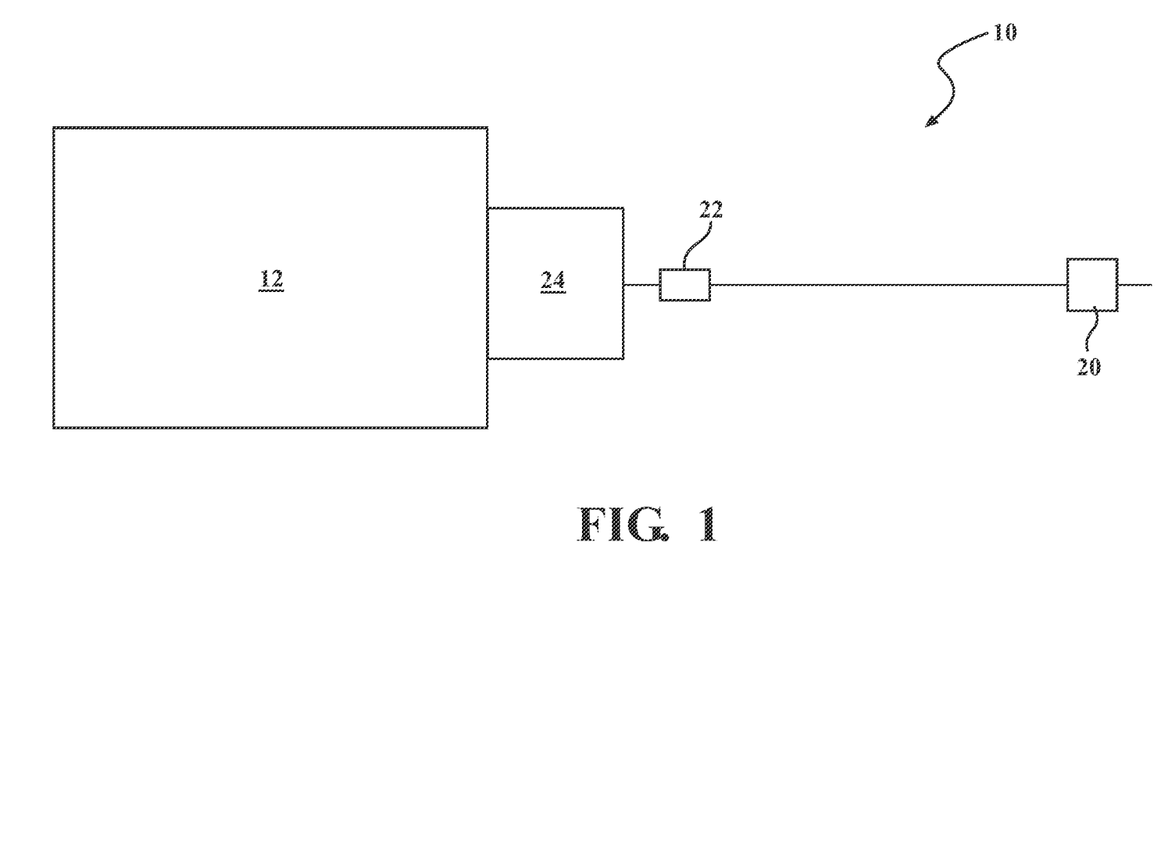
FIG. 1 is a schematic view of a vehicle including a turbocharger.

Referring now to the figures, where like numerals are used to designate like structure unless otherwise indicated, a system is schematically illustrated at 10. As illustrated in FIG. 1, the system 10 includes an internal combustion engine 12 configured to produce exhaust gas. The internal combustion engine 12 is in rotational communication with a vehicle transmission. The transmission may be any type of transmission including a hybrid, manual, automatic, or semi-automatic transmission as known by one of ordinary skill in the art. The internal combustion engine 12 generates rotational torque which is selectively translated to the transmission through a shaft which, in turn, translates rotational torque to one or more wheels. It should further be appreciated that the internal combustion engine 12 and/or transmission could be configured in any suitable way sufficient to generate and translate rotational torque so as to drive a vehicle, without departing from the scope of the present invention.

The system 10 also includes an exhaust system 20. The exhaust system 20 is configured to deliver exhaust gas out of the vehicle. Typically, the exhaust system 20 includes piping which is configured to guide the exhaust gas out of the vehicle. The exhaust system 20 may also include a muffler configured to reduce noise emitted by the exhaust gas exiting the exhaust system 20 and a tailpipe configured to direct the exhaust gas out of a rear or side of the vehicle. Other embodiments may include an exhaust pipe in addition to or in place of a tailpipe configured to direct the exhaust gas vertically out of the vehicle.

The system 10 also includes a catalytic converter 22 disposed between the internal combustion engine 12 and the exhaust system 20. The catalytic converter 22 is an exhaust emission control device configured to convert toxic gases and other pollutants in the exhaust gas into less-toxic forms by catalyzing a redox reaction. Typically, the catalytic converter 22 requires very high temperatures, i.e. 800 degrees F., to efficiently carry out the redox reactions. As such, heating the catalytic converter 22 after a cold start of the internal combustion engine 12 is required. In some embodiments, the catalytic converter 22 is disposed downstream of the internal combustion engine 12 and adjacent to the exhaust system 20 such that exhaust gases which exit the catalytic converter 22 flow directly to the exhaust system 20 where they can exit the vehicle. In other embodiments, the catalytic converter 22 is at least partially disposed within the turbine housing 26. In yet another embodiment, the catalytic converter 22 is disposed adjacent to the turbine housing outlet 34. However, it is also contemplated that the catalytic converter 22 may be disposed anywhere between the internal combustion engine 12 and the exhaust system 20. The catalytic converter 22 has a front face which is defined as the face of the catalytic converter 22 which is closest to the internal combustion engine 12 and includes an inlet into the catalytic converter 22. In other words, the front face is the face of the catalytic converter 22 which is exposed to the stream of exhaust gas prior to or while entering the catalytic converter 22.

Figure 2:
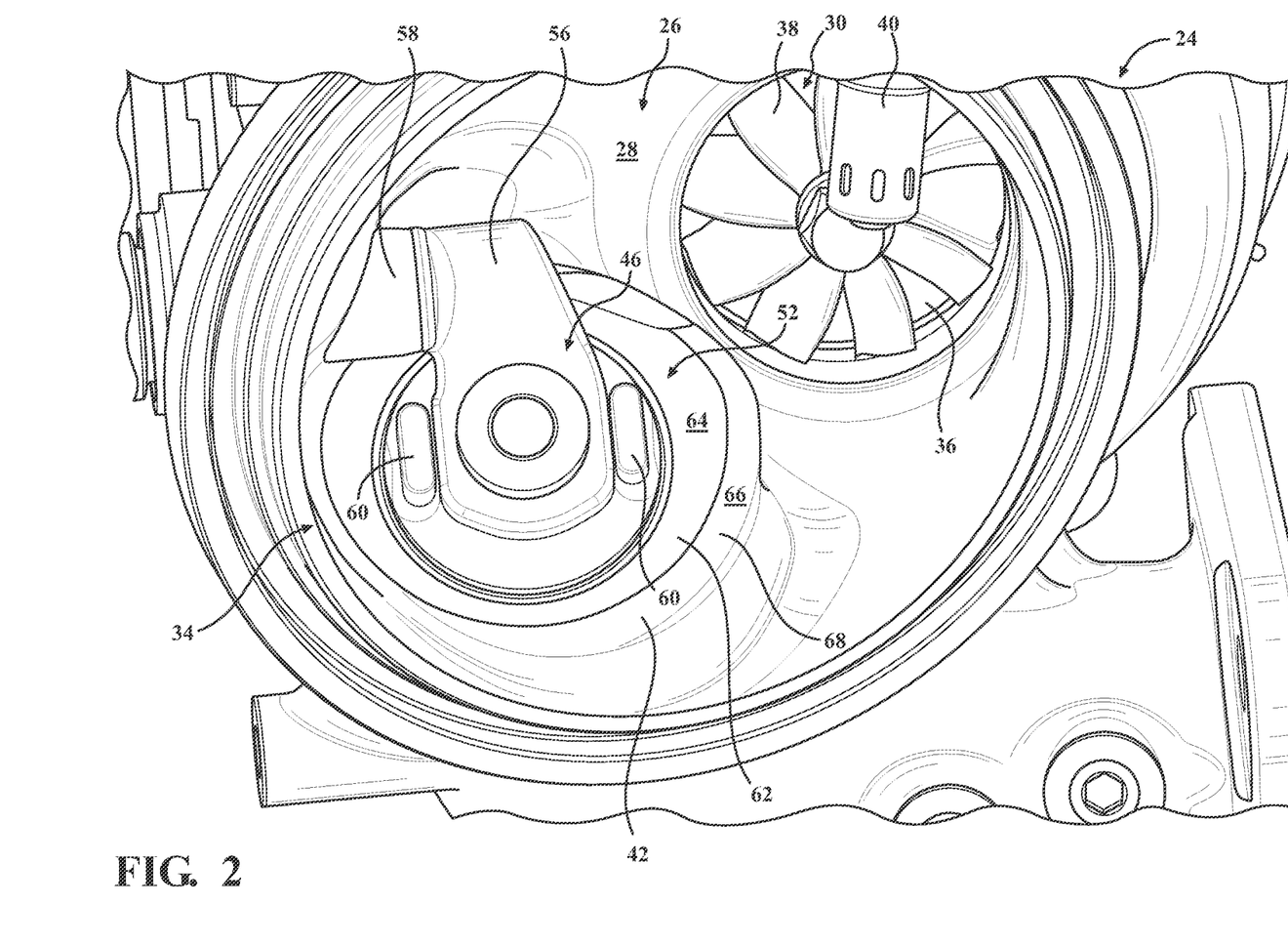
FIG. 2 is a partial perspective view of an interior of a turbine housing of the turbocharger having a valve in a first position.

Moreover, the system 10 includes a turbocharger 24 disposed between the internal combustion engine 12 and the catalytic converter 22. The turbocharger 24 receives exhaust gas from the internal combustion engine 12 and directs exhaust gas to the exhaust system 20. Referring now to FIG. 2, the turbocharger 24 includes a turbine housing 26 which includes an interior surface 28 which defines a turbine housing interior 30. The interior surface 28 extends between a turbine housing inlet 32 (see FIG. 5) and a turbine housing outlet 34. The turbine housing inlet 32 is defined at one end of the interior surface 28 and is in fluid communication with the turbine housing interior 30 and the internal combustion engine 12 for moving the exhaust gas to the turbine housing interior 30 from the internal combustion engine 12. Moreover, the turbine housing outlet 34 is defined at an opposite end of the interior surface 28 and is in fluid communication with the turbine housing interior 30 for discharging the exhaust gas from the turbine housing interior 30.

The turbine housing interior 30 also defines a turbine channel 36 disposed between the turbine housing inlet 32 and the turbine housing outlet 34. As illustrated in the embodiment shown in FIG. 2, the turbine channel 36 includes a turbine wheel 38 disposed therein. It is contemplated that the turbine wheel 38 may be disposed completely inside the turbine channel 36 or may be disposed partially within the turbine channel 36. Moreover, it is contemplated that the turbine wheel 38 may be disposed at an inlet of the turbine channel 36 or at an outlet of the turbine channel 36, as desired. Additionally, the turbine wheel 38 is in communication with the turbine housing inlet 32 and the turbine housing outlet 34 for discharging exhaust gas to the turbine housing outlet 34. Typically, exhaust gas that exits the turbine channel 36 is directed towards the turbine housing outlet 34. However, it is also contemplated that a portion of the exhaust gas which exits the turbine channel 36 may be directed towards the exhaust system 20 such that the exhaust gas from the turbine channel 36 contacts the catalytic converter 22 before exiting the vehicle through the exhaust system 20.

The turbine housing 26 may also include a sensor 40 disposed between the turbine wheel 38 and the turbine housing outlet 34. The sensor 40 may be a lambda sensor or any other sensor as desired by one of ordinary skill in the art. The sensor 40 is configured to sense the ratio of air to fuel present in the exhaust gases. In one embodiment, the sensor 40 is disposed at the outlet of the turbine channel 36 such that the sensor 40 accurately senses the ratio present in the exhaust gases leaving the turbine wheel 38. It is also contemplated that the sensor 40 may be disposed elsewhere in the turbine housing interior 30 and/or that the turbocharger 24 may include multiple sensors 40.

Figure 3:
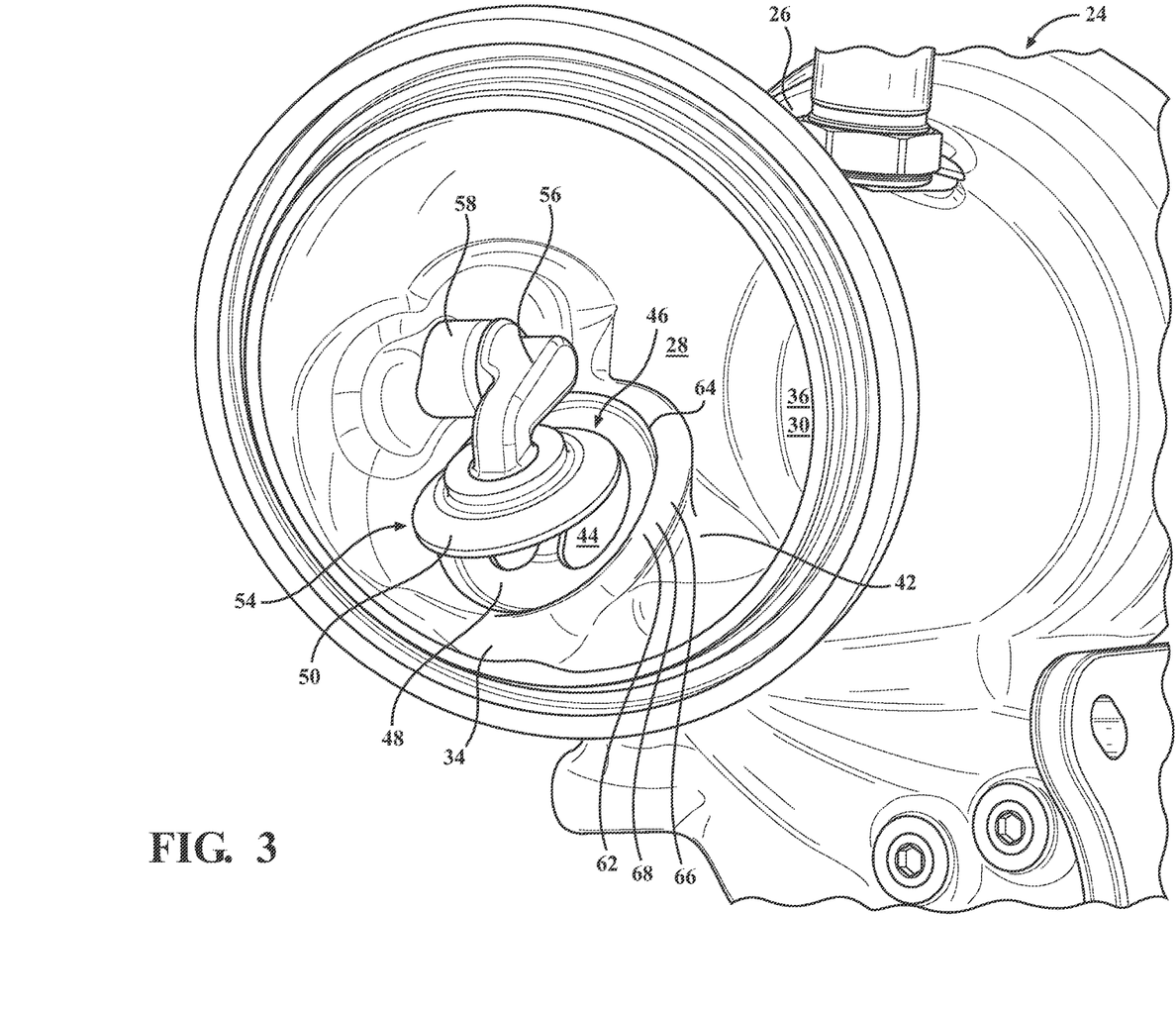
FIG. 3 is a partial side perspective view of the interior of the turbine housing of the turbocharger having the valve in a second position.
Figure 4:
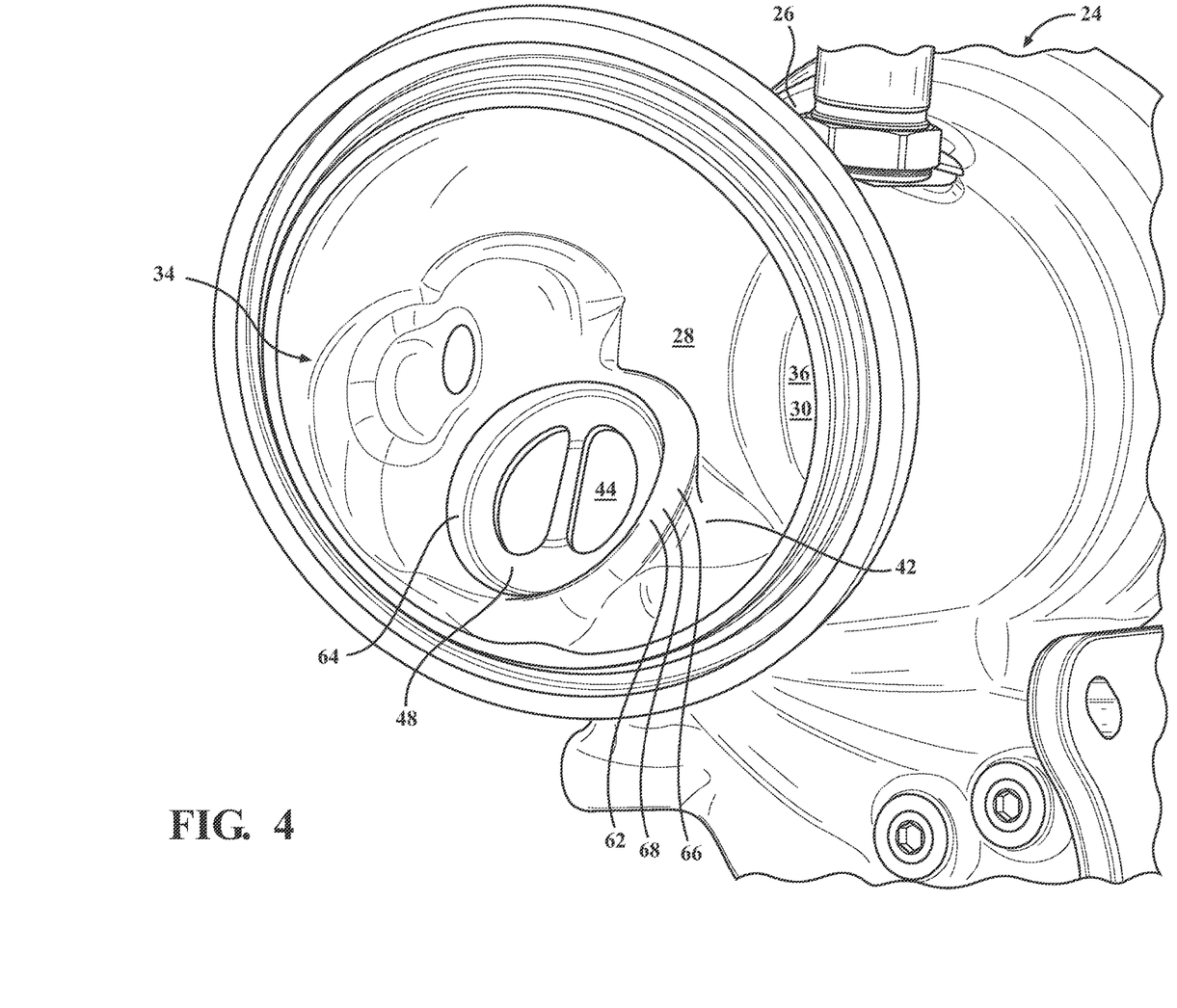
FIG. 4 is a partial side perspective view of the interior of the turbine housing of the turbocharger having the valve removed for illustrative purposes.

The turbocharger 24 also includes a wastegate duct 42 disposed between the turbine housing inlet 32 and the turbine housing outlet 34. Moreover, the wastegate duct 42 defines a wastegate channel 44 in fluid communication with the turbine housing inlet 32 and the turbine housing outlet 34 for discharging the exhaust gas to the turbine housing outlet 34 by bypassing the turbine housing interior 30. Additionally, it is contemplated that the exhaust gas which flows through the wastegate duct 42 may completely bypass the turbine housing interior 30 such that the exhaust gas flows directly from the turbine housing inlet 32 to the turbine housing outlet 34, or it is contemplated that a portion of the exhaust gas may flow in the turbine housing interior 30 either prior to entering the wastegate duct 42 from the turbine housing inlet 32 or after exiting the wastegate duct 42 before flowing to the turbine housing outlet 34. As best illustrated in FIGS. 2-4, the wastegate channel 44 is configured such that an outlet of the wastegate channel 44 is circular in shape. However, it is also contemplated that the outlet of the wastegate channel 44 may be oblong, oval, square, or another shape as desired by one of ordinary skill in the art.

Moreover, the turbocharger 24 includes a wastegate assembly 46 disposed within the turbine housing 26 for controlling the flow of exhaust gas through the wastegate channel 44. The wastegate assembly 46 includes a valve seat 48 disposed within the wastegate channel 44. It is contemplated that the valve seat 48 may be completely disposed within the wastegate channel 44, as illustrated in the embodiment shown in FIGS. 3 and 4, or the valve seat 48 may be partially disposed within the wastegate channel 44 such that a portion of the valve seat 48 is outside of the wastegate channel 44. Moreover, in the embodiment illustrated in FIGS. 3 and 4, the valve seat 48 is disposed at the outlet of the wastegate channel 44. However, it is also contemplated that the valve seat 48 may be disposed partially within the outlet, adjacent to the outlet, or elsewhere in or adjacent to the wastegate channel 44. As additionally illustrated in FIGS. 3 and 4, the valve seat 48 typically has a circular outer portion 'such that the outer portion is in contact with the wastegate channel 44 and shrinks the circumference in which the exhaust gas can flow at the outlet of the wastegate channel 44. In other words, the outer portion of the valve seat 48 is fitted to abut an internal surface of the wastegate duct 42 such that the circumference of the aperture is smaller than the circumference of the wastegate channel 44 and limits the flow of the exhaust gas from the exit of the wastegate channel 44. It is also contemplated that the valve seat may be integral with the wastegate channel 44. In the embodiment illustrated in FIGS. 3 and 4, the valve seat 48 includes a dividing portion such that the valve seat 48 is configured for a twin scroll turbocharge application. It is also contemplated that the valve seat 48 may not include a dividing portion such that the valve seat 48 is configured for a mono scroll turbocharge application. The valve seat 48 may be comprised of a metal such as steel or steel alloy, as desired by one of ordinary skill in the art.

The wastegate assembly 46 also includes a valve 50 engageable with the valve seat 48. The valve 50 in the embodiment shown in FIG. 3 is a swing valve, although the valve 50 may be any type of valve including, but not limited to, a piston and ball valve, a butterfly valve, and a stop and tilting disk valve. The valve 50 is movable between a first position 52 and a second position 54. In the first position 52, the valve 50 is engaged with the valve seat 48 for preventing flow of exhaust gas through the wastegate channel 44. In the second position 54, the valve 50 is disengaged with the valve seat 48 for allowing flow of exhaust gas through the wastegate channel 44. The valve 50 may be partially disengaged from the valve seat 48 in the second position 54 such that a portion of the valve 50 is engaged with the valve seat 48, or the valve 50 may be completely disengaged from the valve seat 48, as desired to control flow from the wastegate channel 44. In the embodiment illustrated in FIG. 3, the valve 50 moves from the first position 52 to the second position 54 in a swinging motion and at an angle such that an upper portion of the valve 50 is disposed closer to the valve seat 48 than a lower portion of the valve 50 when the valve 50 is in the second position 54. However, it is also contemplated that the valve 50 may move from the first position 52 to the second position 54 in any way as desired.

In the embodiment illustrated in FIG. 3, the wastegate assembly 46 also includes a valve arm 56 coupled to the valve 50 in order to move the valve 50 between the first position 52 and the second position 54. The wastegate assembly 46 also includes a bushing 58 coupled to the valve arm 56 and configured to allow the valve arm 56 to rotate in order to move the valve 50 between the first position 52 and the second position 54. It is also contemplated that the valve 50 may include a different mechanism for moving the valve 50 between the first position 52 and the second position 54 including, but not limited to, a spring, a piston, an electronic actuator, or a pneumatic actuator. In the embodiment illustrated in FIG. 3, the valve arm 56 is coupled to the valve 50 in a center of the valve 50. However, it is contemplated that the valve arm 56 may be coupled to the valve 50 in any location, as desired by one of ordinary skill in the art.

In the embodiment illustrated in FIG. 2, the wastegate assembly 46 also includes a plurality of anti-rotating features 60 disposed on either side of the valve 50. The anti-rotating features 60 are configured to prevent the valve 50 from rotating when not being moved between the first position 52 and the second position 54. In the embodiment illustrated in FIG. 2, the wastegate assembly 46 includes two oval-shaped anti-rotating features 60. However, it is also contemplated that the wastegate assembly 46 may include any number of anti-rotating features 60 in any shape including, but not limited to, square, rectangular, or triangular.

In the embodiment illustrated in FIG. 3, the valve 50 is circular in shape. However, it is also contemplated that the valve 50 may be any shape including, but not limited to, oval, square, or triangular. In one embodiment, the valve 50 has a diameter of approximately 30-50 mm. In another embodiment, the valve 50 has a diameter of approximately 35-45 mm. In yet another embodiment the valve 50 has a diameter of approximately 40 mm. However, it is also contemplated that the valve 50 may have a smaller or larger diameter depending on the size and shape of one or more of the turbocharger 24, the wastegate channel 44, and the valve seat 48.

The turbocharger 24 also includes a diffuser 62 at least partially surrounding the valve seat 48 of the turbine housing 26 for uniformly diffusing the flow of exhaust gas into the turbine housing outlet 34. It is contemplated that the diffuser 62 may partially or completely surround the valve seat 48. In one embodiment, the diffuser 62 surrounds the valve seat at a minimum of 30 degrees. In another embodiment, the diffuser 62 surrounds the valve seat 48 at a minimum of 45 degrees. In yet another embodiment, the diffuser surrounds the valve seat 48 at a minimum of 60 degrees. The diffuser 62 includes an inside surface 64 disposed about the valve seat 48 for uniformly diffusing the flow of exhaust gas into the turbine housing outlet 34. In the embodiment illustrated in FIG. 3, the inside surface 64 of the diffuser 62 encircles the valve seat 48 such that the diffuser 62 is disposed at the exit of the wastegate channel 44. However, it is also contemplated that the inside surface 64 may partially encircle or completely encircle the valve seat 48. It is also contemplated that the inside surface 64 of the diffuser 62 forms a ring around the valve seat 48. In the embodiment illustrated in FIGS. 2-4, the inside surface 64 of the diffuser 62 extends upwards and away from, i.e. in the x and y directions of the standard Cartesian coordinate system, the valve seat 48 such that the circumference of the diffuser 62 at a base of the inside surface 64 is smaller than a circumference of the diffuser 62 at an opposite end. Moreover, it is contemplated that the inside surface 64 extends to a height which is higher than a height of the valve seat 48. In some embodiments, at least a portion of the inside surface 64 is covered by the valve 50 when the valve 50 is in the first position 52. The diffuser 62 also includes an outside surface 66 which is formed as part of the interior surface 28 of the turbine housing 26. The outside surface 66 and the inside surface 64 are connected by a curved portion 68. The curved portion 68 may be shaped to have any angle, as desired. The diffuser 62 may be of any size and shape which is configured to uniformly distribute the flow of exhaust gas into the turbine housing inlet 32. In one embodiment, the diffuser 62 has a minimum height of approximately 1/20 of the diameter of the valve 50. In another embodiment, the diffuser 62 has a minimum height of approximately 1/10 of the diameter of the valve 50. In yet another embodiment, the diffuser 62 has a minimum height of approximately 1/5 of the diameter of the valve 50.

In the embodiments illustrated in FIGS. 2-4, the diffuser 62 is completely disposed within the turbine housing 26; however, it is also contemplated that the diffuser 62 may be only partially disposed within the turbine housing 26 such that a portion of the diffuser 62 extends through the turbine housing outlet 34. Additionally, the diffuser 62 illustrated in the embodiments shown in FIGS. 2-4 is formed as a casting along with the interior surface 28 of the turbine housing 26 such that the diffuser 62 and the interior surface 28 of the turbine housing 26 are formed as a single, integral piece. However, it is also contemplated that the diffuser 62 may be formed as a separate piece and be welded to or otherwise joined with the interior surface 28 of the turbine housing 26. Moreover, the inside surface 64 of the diffuser 62 may be machined after the casting process to form a smooth inside surface 64. More specifically, in one embodiment, the inside surface 64 of the diffuser 62 is machined to a surface roughness level (Rz) of approximately 30-50 micrometers. In one embodiment, the surface roughness level (Rz) of the inside surface 64 is approximately 35-45 micrometers. In yet another embodiment, the surface roughness level (Rz) of the inside surface 64 of the diffuser 62 is approximately 40 micrometers. However, it is contemplated that the surface roughness level (Rz) of the inside surface 64 of the diffuser 62 may be higher or lower than the examples given without departing from the spirit of the invention.

Figure 5:
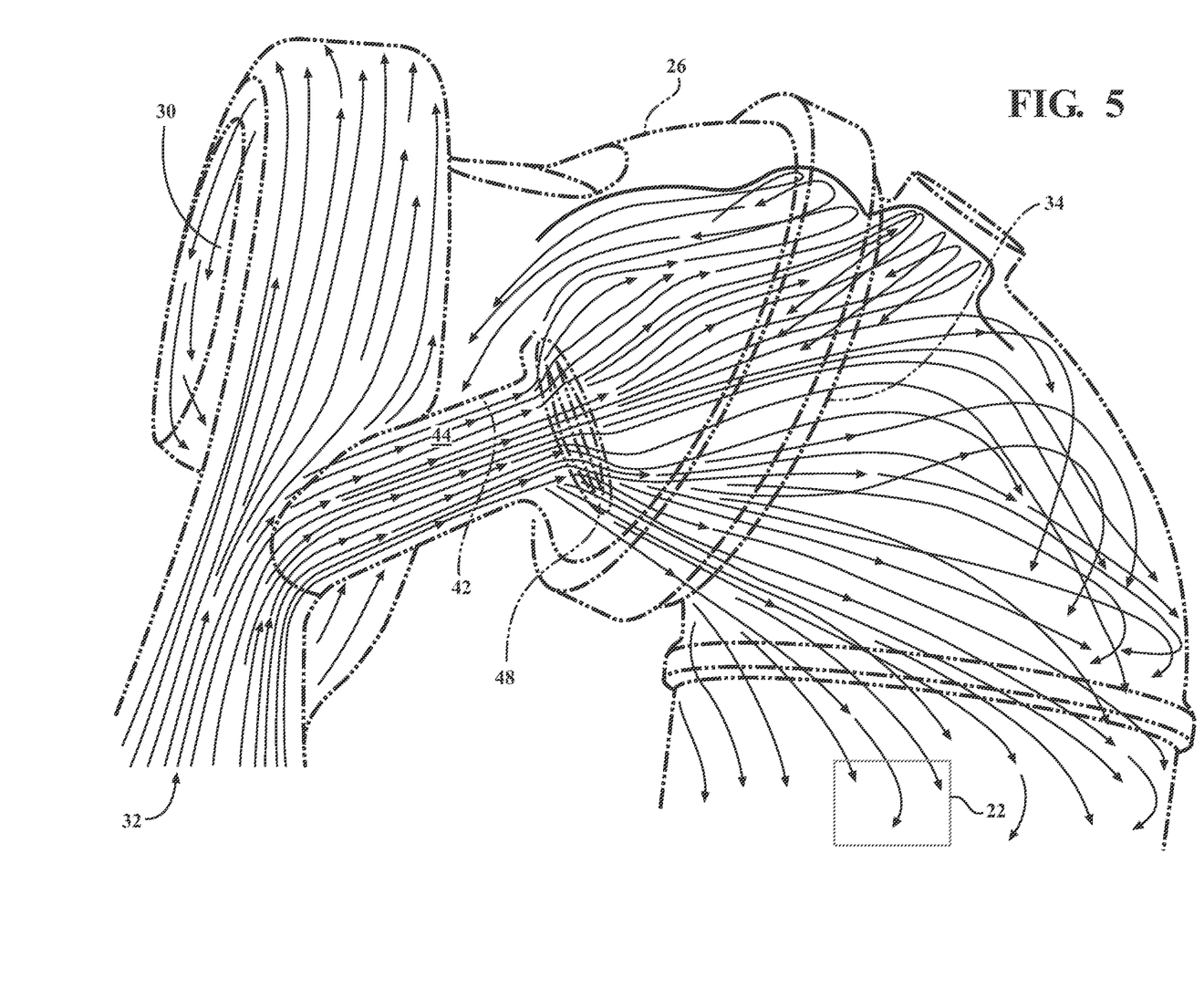
FIG. 5 is a side view of a flow contour diagram according to the present invention.
Figure 6:
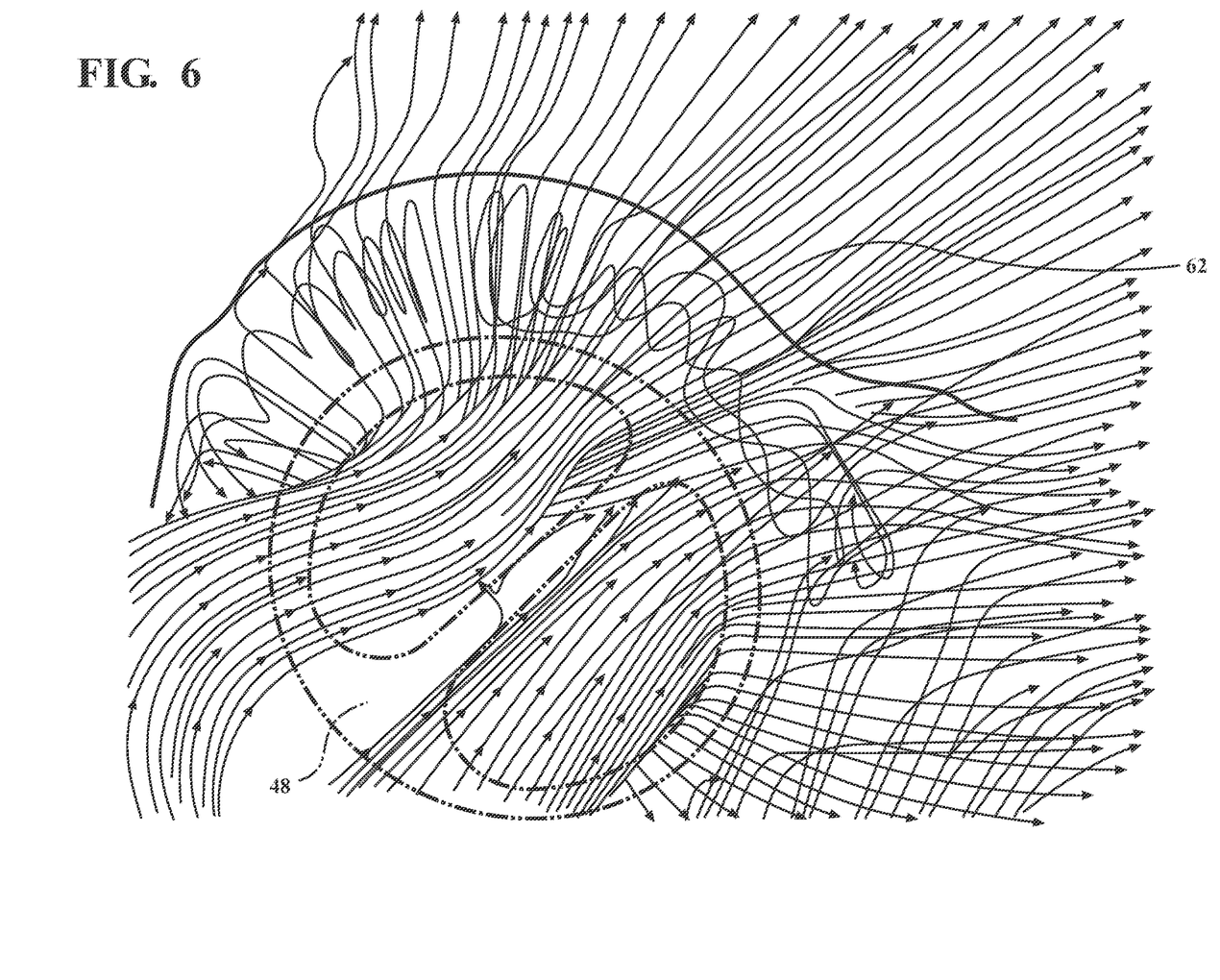
FIG. 6 is a bottom side view of the flow contour diagram according to the present invention.
Figure 7:
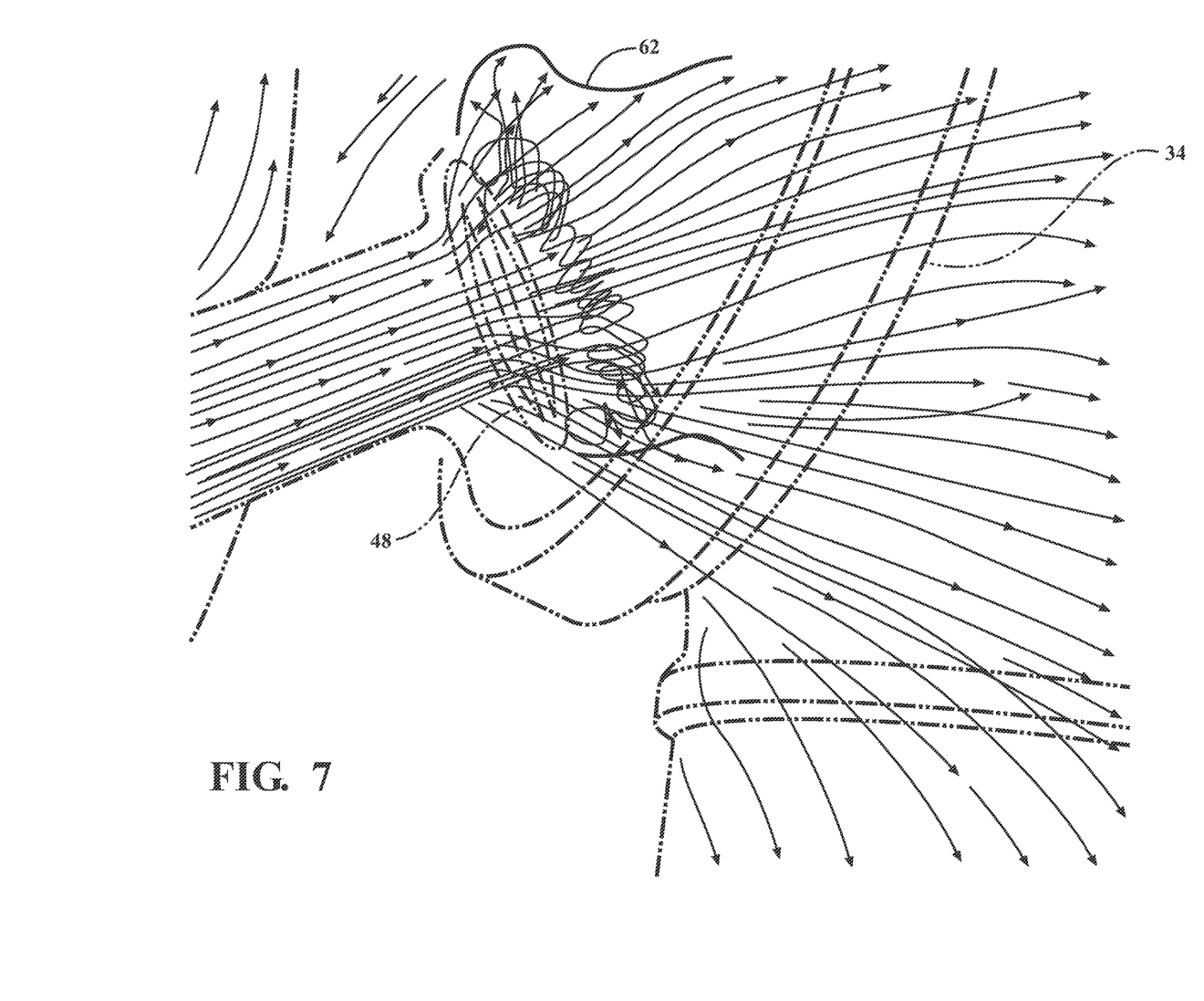
FIG. 7 is a top side view of the flow contour diagram according to the present invention.

In operation, the internal combustion engine 12 is activated causing exhaust gas to flow from the internal combustion engine 12 to the turbine housing inlet 32. The activation may occur by a manual method such as a user turning a key to activate the internal combustion engine 12, or may occur by an electronic method such as an electronic actuator activating the internal combustion engine 12. The valve 50 begins in the first position 52 where the valve 50 is engaged with the valve seat 48 for preventing flow of the exhaust gas through the wastegate channel 44. When desired, the valve 50 is moved from the first position 52 to the second position 54 where the valve 50 is disengaged with the valve seat 48 for allowing flow of exhaust gas through the wastegate channel 44. As described above, the movement of the valve 50 from the first position 52 to the second position 54 may be actuated by the valve arm 56 which is configured to rotate within the bushing 58 allowing the valve 50 to move to the second position 54. As best illustrated in FIGS. 5-7, once the exhaust gas flows to the exit of the wastegate channel 44, the exhaust gas contacts the diffuser 62 where the flow of exhaust gas is uniformly diffused through the turbine housing outlet 34 to the catalytic converter 22. The exhaust gas will then exit the catalytic converter 22 to the exhaust system 20 where the exhaust gas will then exit the vehicle.

Additionally, gas flowed through the turbine housing inlet 32 may also flow though the turbine channel in communication with the turbine housing inlet 32. The exhaust gas will flow through the turbine channel to the turbine wheel 38. After exiting the turbine channel, the exhaust gas will flow to the sensor 40 before flowing to the turbine housing outlet 34 where the exhaust gas will flow back to the internal combustion engine 12.

Having the diffuser 62 at least partially surrounding the valve seat 48 allows the exhaust gas exiting the wastegate duct 42 to be uniformly diffused into the turbine housing outlet 34 and to the catalytic converter 22. Having a uniform flow of exhaust gas to the catalytic converter 22 improves heating of the catalytic converter 22 during a cold start of the internal combustion engine 12 by uniformly directing the flow to the catalytic converter 22 and thereby improving operation of the catalytic converter 22. Moreover, uniformly diffusing the exhaust gas to the catalytic converter 22 will lead to the spreading out of the streams of exhaust gas, as illustrated in FIGS. 5-7, which prevents premature failure of the catalytic converter 22 due to numerous high velocity exhaust gas streams reaching the front face of the catalytic converter 22. Moreover, uniformly diffusing the exhaust gas may slow down the velocity of the exhaust streams moving to the catalytic converter 22 which may prevent failure of the catalytic converter 22 due to the high velocity exhaust streams reaching the front face of the catalytic converter 22. Finally, uniformly diffusing the exhaust gas into the turbine housing outlet 34 and to the catalytic converter 22 may lead to vehicle performance advantages such as improved emissions from the exhaust system due to a faster and more uniform warmup of the catalytic converter 22.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for receiving exhaust gas from an internal combustion engine and for delivering exhaust gas to an exhaust system, said turbocharger comprising:
    a turbine housing comprising:
        an interior surface defining a turbine housing interior, said interior surface extending between:
            a turbine housing inlet defined at one end of said interior surface and in fluid communication with the internal combustion engine and said turbine housing interior for delivering exhaust gas from the internal combustion engine to said turbine housing interior, and
            a turbine housing outlet defined at an opposite end of said interior surface and in fluid communication with said turbine housing interior for discharging exhaust gas from said turbine housing interior; and
        a wastegate duct disposed between said turbine housing inlet and said turbine housing outlet and defining a wastegate channel in fluid communication with said turbine housing inlet and said turbine housing outlet for discharging exhaust gas to said turbine housing outlet from said turbine housing inlet by bypassing said turbine housing interior;
    a valve seat disposed within said wastegate channel;
    a wastegate assembly disposed within said turbine housing for controlling flow of exhaust gas through said wastegate channel, said wastegate assembly comprising:
        a valve engageable with said valve seat, with said valve moveable between:

a first position where said valve is engaged with said valve seat for preventing flow of exhaust gas through said wastegate channel, and a second position where said valve is disengaged with said valve seat for allowing flow of exhaust gas through said wastegate channel; and a diffuser at least partially surrounding said valve seat for uniformly diffusing the flow of exhaust gas into said turbine housing outlet.

2. The turbocharger of claim 1, wherein said diffuser comprises an inside surface disposed about said valve seat for uniformly diffusing the flow of exhaust gas into said turbine housing outlet.

3. The turbocharger of claim 2, wherein said inside surface of said diffuser encircles said valve seat for uniformly diffusing the flow of exhaust gas into said turbine housing outlet.

4. The turbocharger of claim 2, wherein said inside surface of said diffuser forms a ring around said valve seat for uniformly diffusing the flow of exhaust gas into said turbine housing outlet.

5. The turbocharger of claim 1, wherein said diffuser completely surrounds said valve seat such that a height of said diffuser is greater than a height of said valve seat.

6. The turbocharger of claim 1, wherein said diffuser is completely disposed within said turbine housing.

7. The turbocharger of claim 1, further comprising a turbine wheel in fluid communication with said turbine housing inlet and said turbine housing outlet for discharging exhaust gas to said turbine housing outlet and a lambda sensor mounted to said turbine housing between said turbine wheel and said turbine housing outlet.

8. The turbocharger of claim 1, wherein said wastegate assembly further comprises a valve arm coupled to said valve for moving said valve between said first position and said second position.

9. The turbocharger of claim 1, wherein said diffuser is integrally formed with said turbine housing.

10. The turbocharger of claim 1, wherein said valve of said wastegate assembly is a swing valve.

11. A system for a vehicle, said system comprising:
an internal combustion engine which produces exhaust gas;
an exhaust system configured to deliver the exhaust gas out of the vehicle;
a catalytic converter disposed between said internal combustion engine and said exhaust system; and
a turbocharger for receiving exhaust gas from said internal combustion engine and for delivering exhaust gas to said exhaust system, said turbocharger comprising:
a turbine housing comprising:
an interior surface defining a turbine housing interior, said interior surface extending between:
a turbine housing inlet defined at one end of said interior surface and in fluid communication with the internal combustion engine and said turbine housing interior for delivering exhaust gas from the internal combustion engine to said turbine housing interior, and
a turbine housing outlet defined at an opposite end of said interior surface and in fluid communication with said turbine housing interior for discharging exhaust gas from said turbine housing interior; and
a wastegate duct disposed between said turbine housing inlet and said turbine housing outlet and defining a wastegate channel in fluid communication with said turbine housing inlet and said turbine housing outlet for discharging exhaust gas to said turbine housing outlet from said turbine housing inlet by bypassing said turbine housing interior;

a valve seat disposed within said wastegate channel;

a wastegate assembly for controlling flow of exhaust gas through said wastegate channel, said wastegate assembly comprising:
a valve engageable with said valve seat, with said valve moveable between:
a first position where said valve is engaged with said valve seat for preventing flow of exhaust gas through said wastegate channel, and
a second position where said valve is disengaged with said valve seat for allowing flow of exhaust gas through said wastegate channel; and
a diffuser at least partially surrounding said valve seat for uniformly diffusing the flow of exhaust gas into said turbine housing outlet.

12. The system of claim 11, wherein said diffuser comprises an inside surface disposed about said valve seat of said turbine housing for diffusing the flow of exhaust gas into said turbine housing outlet.

13. The system of claim 12, wherein said inside surface of said diffuser encircles said valve seat for uniformly diffusing the flow of exhaust gas into said turbine housing outlet.

14. The system of claim 12, wherein said inside surface of said diffuser forms a ring around said valve seat for uniformly diffusing the flow of exhaust gas into said turbine housing outlet.

15. The system of claim 11, wherein said diffuser completely surrounds said valve seat such that a height a said diffuser is greater than a height of said valve seat.

16. The system of claim 11, wherein said diffuser is completely disposed within said turbine housing.

17. The system of claim 11, wherein said turbocharger further comprises a turbine wheel in fluid communication with said turbine housing inlet and said turbine housing outlet for discharging exhaust gas to said turbine housing outlet and a lambda sensor mounted in said turbine housing adjacent to said turbine wheel such that exhaust gas discharged from said turbine wheel flows to said lambda sensor before flowing to said turbine housing outlet.

18. The system of claim 11, wherein said catalytic converter is disposed adjacent to said turbine housing outlet.

19. A method of operating a system for a vehicle, the system comprising: an internal combustion engine configured to produce exhaust gas; an exhaust system configured to deliver exhaust gas out of the vehicle; a catalytic converter disposed between the internal combustion engine and the exhaust system; and a turbocharger for receiving exhaust gas from the internal combustion engine and for delivering exhaust gas to the exhaust system, the turbocharger comprising: a turbine housing comprising: an interior surface defining a turbine housing interior, the interior surface extending between: a turbine housing inlet defined at one end of the interior surface and in fluid communication with the internal combustion engine and the turbine housing interior for delivering exhaust gas from the internal combustion engine to the turbine housing interior, and a turbine housing outlet defined at an opposite end of the interior surface and in fluid communication with the turbine housing interior for discharging exhaust gas from the turbine housing interior; and a wastegate duct disposed between the turbine housing inlet and the turbine housing outlet and defining a wastegate channel in fluid communication with the turbine housing inlet and the turbine housing outlet for discharging exhaust gas to the turbine housing outlet from the turbine housing inlet by bypassing the turbine housing interior; a wastegate assembly for controlling flow of exhaust gas through the wastegate channel, the wastegate assembly comprising: a valve seat disposed within the wastegate channel; and a valve engageable with the valve seat, with the valve moveable between a first position and a second position; and a diffuser at least partially surrounding the valve seat for diffusing the flow of exhaust gas into the turbine housing outlet, said method comprising:

activating the internal combustion engine causing exhaust gas to flow from the internal combustion engine to the turbine housing inlet of the turbocharger;

moving the valve from the first position where the valve is engaged with the valve seat for preventing flow of exhaust gas through the wastegate channel to the second position where the valve is disengaged with the valve seat for allowing flow of exhaust gas through the wastegate channel; and    uniformly diffusing the exhaust gas exiting the wastegate channel to the catalytic converter using the diffuser.

20. The method of claim 19, further comprising the step of flowing the exhaust gas from the turbine housing inlet of the turbocharger through a turbine wheel in fluid communication with the turbine hosing inlet and to a lambda sensor.

\* \* \* \* \*